Dec. 29, 1964  J. C. SETTLES  3,163,300
IMPACT ENERGY ABSORBING MECHANISM FOR RAILWAY VEHICLES
Filed March 31, 1958  5 Sheets-Sheet 1
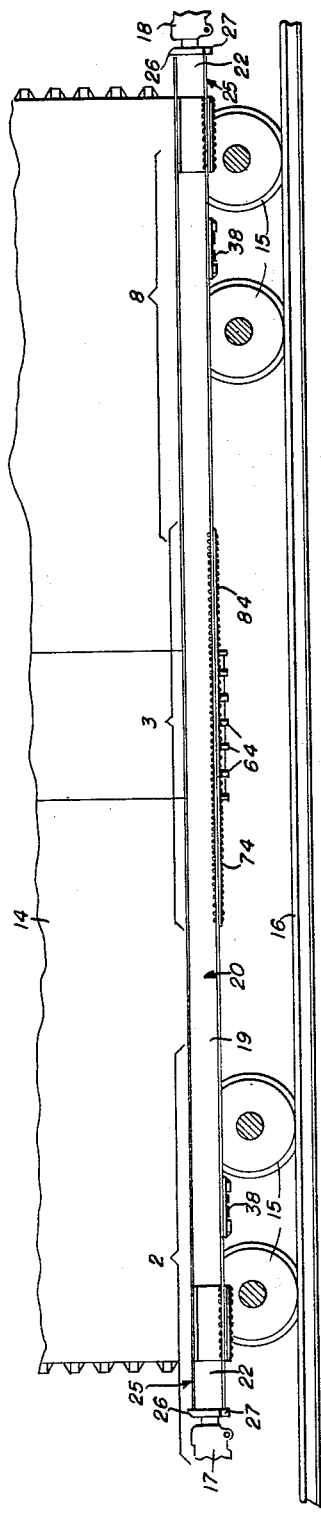
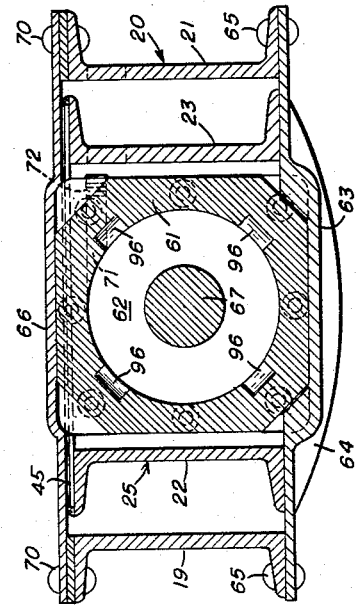
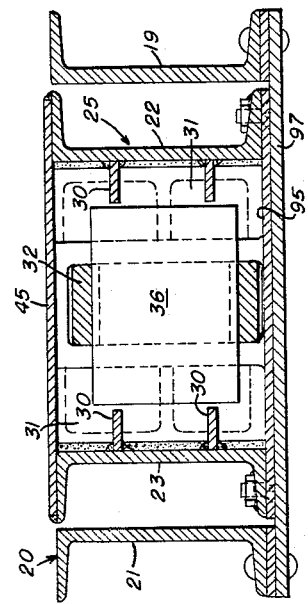
INVENTOR
JAMES C. SETTLES
BY
ATTORNEY

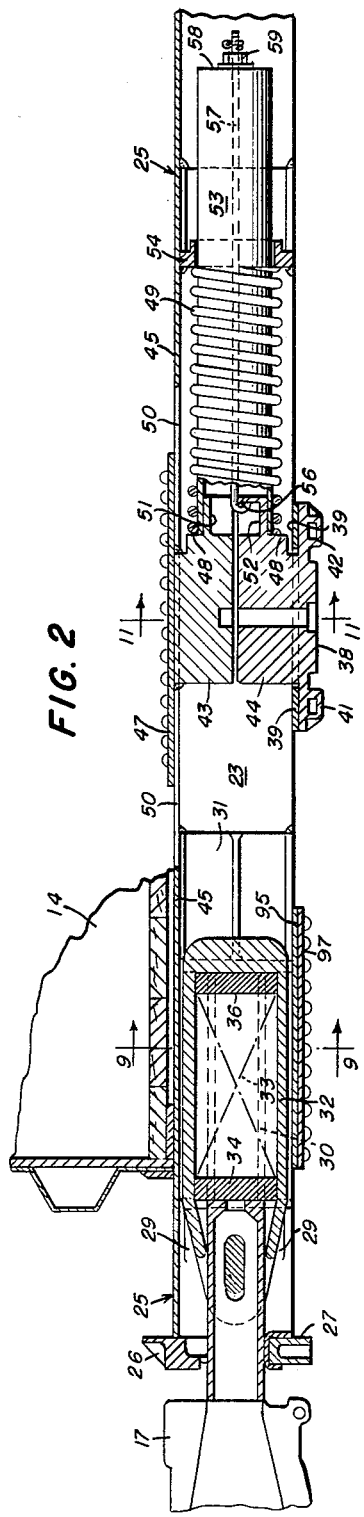

Dec. 29, 1964   J. C. SETTLES   3,163,300
IMPACT ENERGY ABSORBING MECHANISM FOR RAILWAY VEHICLES
Filed March 31, 1958   5 Sheets-Sheet 3

INVENTOR

JAMES C. SETTLES

BY

ATTORNEY

Dec. 29, 1964  J. C. SETTLES  3,163,300
IMPACT ENERGY ABSORBING MECHANISM FOR RAILWAY VEHICLES
Filed March 31, 1958  5 Sheets-Sheet 4
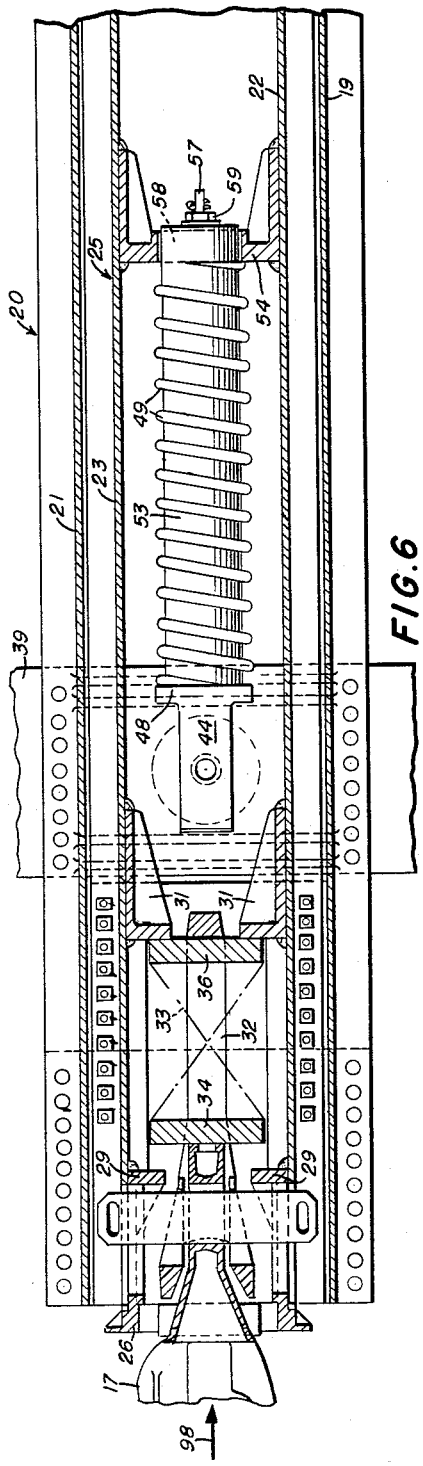
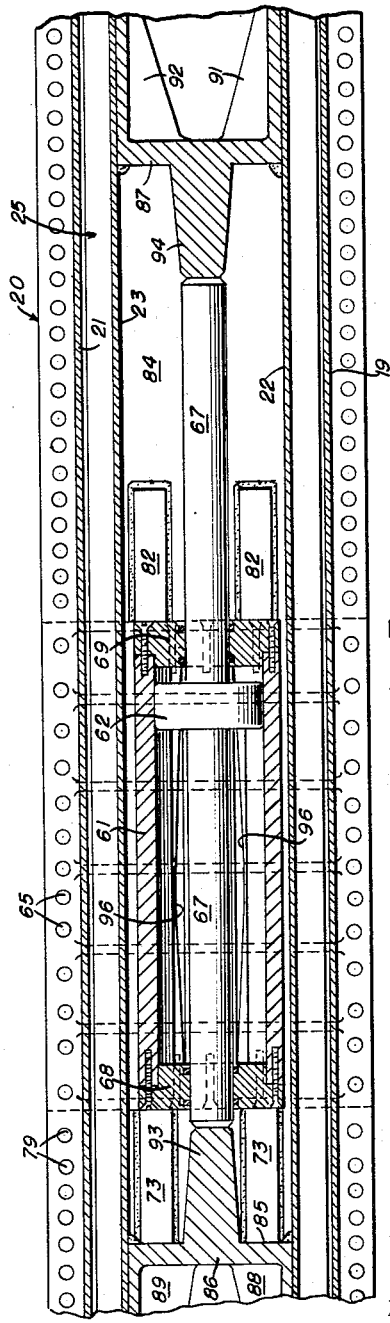
INVENTOR
JAMES C. SETTLES
BY
ATTORNEY Dec. 29, 1964     J. C. SETTLES     3,163,300
IMPACT ENERGY ABSORBING MECHANISM FOR RAILWAY VEHICLES
Filed March 31, 1958     5 Sheets-Sheet 5
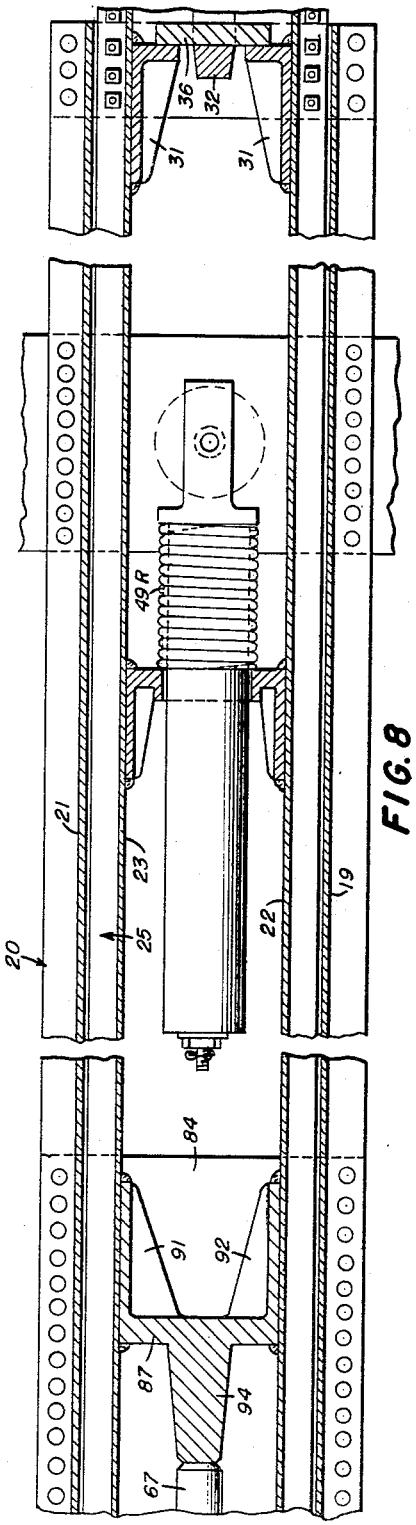
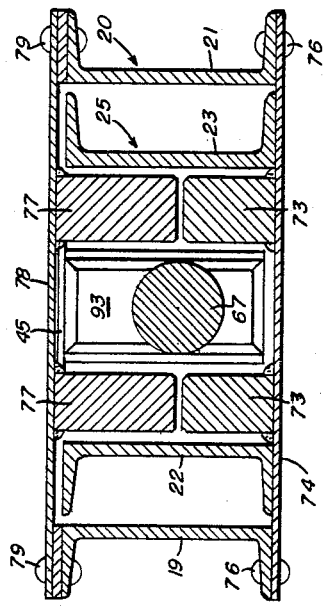
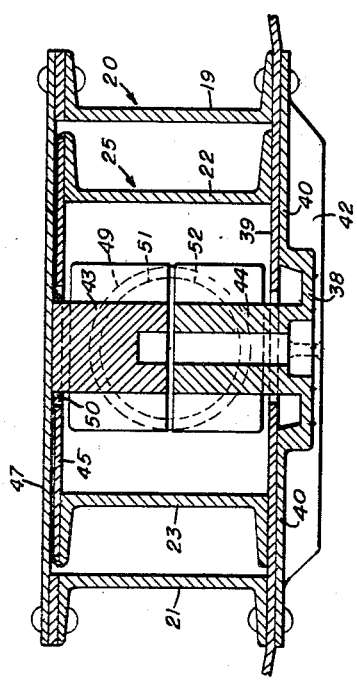
INVENTOR
JAMES C. SETTLES
BY
ATTORNEY United States Patent Office 3,163,300
Patented Dec. 29, 1964

3,163,300
IMPACT ENERGY ABSORBING MECHANISM FOR RAILWAY VEHICLES
James C. Settles, Columbus, Ohio, assignor to The Buckeye Steel Castings Company, Columbus, Ohio
Filed Mar. 31, 1958, Ser. No. 725,352
29 Claims. (Cl. 213—8)

The present invention relates to apparatus in association with railway vehicles for absorbing impact energy and more specifically pertains to liquid cushioning means in operative relationship with the couplers and draft riggings of railway freight cars to provide means for absorbing and dissipating the kinetic energy inherent in collisions which occur during coupling operations, in switching and humping operations, in train operation, or in any type of collisions wherein an impact is applied to either or both couplers.

The railroads of this country have in recent years become concerned with their liability to shippers for merchandise damaged in transit. There is evidence to indicate that a large portion of this damage is a result of end impact forces developed between cars in service and in switching and shunting operations wherein cars are often reassembled in coupled relationship in humping operations. The speed of freight trains and the rate at which switching and humping operations are carried out have increased in recent years which contributes to damage of the load particularly when it consists of fragile merchandise.

In a collision between railway freight cars there is a definite quantity of kinetic energy which must be absorbed. The quantity of kinetic energy depends only on the weights of the moving bodies and the square of their initial speed of approach. Some of the draft gears in use in freight service are of the spring type provided with means for developing friction to increase both the energy absorption and dissipation capacities of the device. Such draft gears do not have adequate capacity to absorb the energy of collisions at initial speeds of approach greater than four to five miles per hour. Another conventional type of draft gear is provided with rubber to impart resilient character thereto and has somewhat increased the capacity for absorbing impact energy. The spring and friction type of device and the draft gear having rubber therein both close to a solid condition when the speed of collision is high and the energy to be absorbed is greater than the capacity of the draft gears. When the draft gear attains a solid condition any excess unabsorbed energy may cause forces to be developed between the cars which are large enough to produce damage to the load carried by either car, and also to the cars themselves.

An object of the present invention is to provide an energy absorbing mechanism in association with a conventional draft rigging and with a suitable center sill structure of a railway freight car wherein liquid forms a part of the mechanism and its flow during collision, is metered to cushion movement of the coupler and an auxiliary sill structure relative to the center sill structure whereby substantially all of the kinetic energy of the collision is absorbed by movement of the liquid and thereafter dissipated as heat.

Another object of the invention is to provide a mechanism for absorbing impact energy of colliding railway vehicles with the mechanism so designed as to avoid recoil action of the absorbed energy and to provide an energy absorbing mechanism which will avoid damage to lading when loaded cars move in to engagement with each other at speeds of approach several times greater than four to five miles per hour.

A more specific object of the invention is to provide an auxiliary center sill structure which may be mounted within a suitable center sill structure fixed to the vehicle body with the auxiliary sill structure adapted to move longitudinally of the fixed sill structure with a single double acting hydraulic device arranged within the sill assembly and actuated upon movement of the auxiliary sill structure relative to the fixed sill structure to cushion impact in either direction and to substantially reduce the magnitude of the forces transmitted to the vehicle body.

A further object of the invention is to provide a center sill structure rigidly secured to a railway vehicle having structural features which will accommodate a rugged double acting hydraulic device therein for cushioning movements of an auxiliary sill structure in either direction relative to the fixed sill structure with means provided on the center sill structure for preventing endwise movements of the hydraulic device and novel means in association therewith for limiting relative longitudinal movements of the two sill structures.

Other and further objects and advantageous features of the invention will be appreciated and become apparent to those skilled in the railway draft appliance art as the present disclosure proceeds and upon consideration of the accompanying drawings and the following detailed description wherein an exemplary embodiment of the invention is disclosed.

In the drawings:

FIG. 1 is a side elevational view of a lower portion of a railway vehicle provided with a hydraulic impact energy absorbing means embodying the invention.

FIG. 2 is a vertical section on a larger scale taken along the longitudinal center of the dual sill assembly showing that portion of the assembly indicated by the bracket 2 in FIG. 1.

FIG. 3 is a similar vertical sectional view of the portion of the energy absorbing mechanism embraced within the bracket 3 of FIG. 1.

FIG. 6 is a sectional plan view similar to FIG. 4 showing the coupler at the left of FIG. 1 and the draft rigging associated therewith displaced to the right to the full closure position with respect to the sill structure fixed to the vehicle body.

FIG. 7 is a sectional plan view similar to FIG. 5 showing the auxiliary sill structure displaced to the right to the full closure position relative to the fixed sill structure.

FIG. 8 is a sectional plan view of that portion of the mechanism and dual sill assembly indicated by the bracket 8 in FIG. 1 showing the auxiliary sill structure displaced to the right to the full closure position relative to the fixed sill structure.

FIG. 9 is an enlarged transverse sectional view taken on the line 9—9 of FIG. 2.

FIG. 10 is a similar sectional view taken on the line 10—10 of FIG. 3.

FIG. 11 is a transverse sectional view taken on the line 11—11 of FIG. 2.

FIG. 12 is a transverse sectional view taken on the line 12—12 of FIG. 3.

FIG. 13 is a fragmentary elevational view of the center post structure showing the spring seat thereon for one of the recoil springs.

Figure 4:
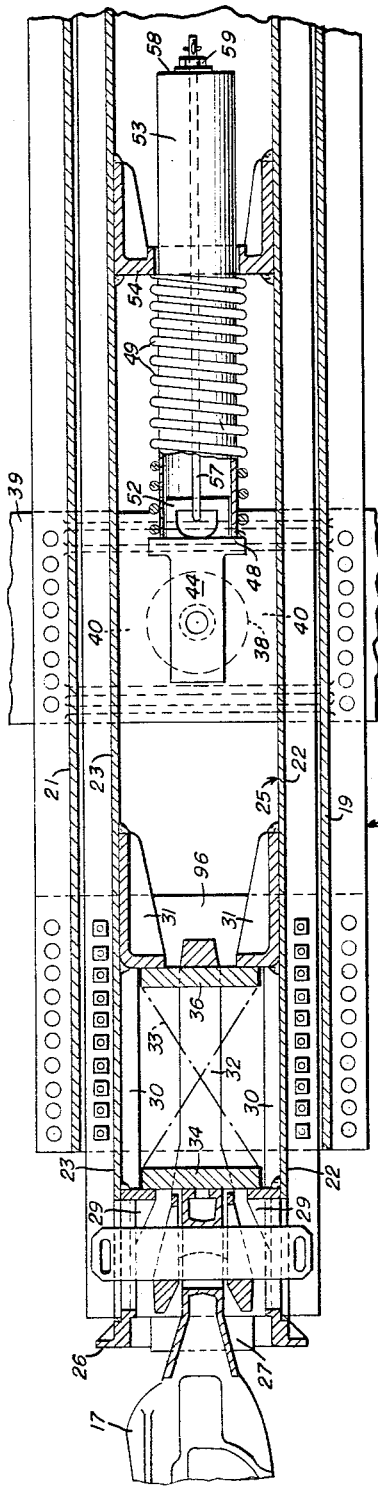
FIG. 4 is a sectional plan view of that portion of the structure shown in FIG. 2.

The invention is directed to hydraulic means in association with a railway vehicle and which has particular utility in connection with freight cars and acts to cushion impacts applied to one or both couplers. The arrangement of the hydraulic means is such that the absorbing mechanism operates during the application of buffing or pulling impact forces applied to either of the couplers. The embodiment of the invention herein disclosed includes one double acting hydraulic device positioned approximately at the center of the vehicle and associated with the couplers at each end of the railway car. The hydraulic device acts to cushion impacts in either direction and the entire mechanism is such that it requires only slightly more space than that taken up by a standard center sill structure. The present invention employing a sole double acting cylinder serving as means for cushioning the impact energy represents a distinguishing feature over my copending application Serial No. 710,967, filed January 24, 1958.

Referring to the drawings there is shown in FIG. 1 a portion of a railway vehicle which for purposes of illustration takes the form of a freight car having a box type body 14 but it will be appreciated that the invention has application to other railway vehicles. The car body 14 is provided with suitable trucks and the wheels 15 for rolling on railway rails 16. The vehicle is provided with a coupler 17 at one end and a coupler 18 at the other end thereof.

In carrying out the invention a center sill structure is employed to accommodate the double acting cylinder for controlling movement of liquid to cushion the impact energy. The center sill structure indicated generally at 20 (FIGS. 1, 4 and 10) is fixed to the car body 14 and extends longitudinally thereof throughout the length of the vehicle. The fixed sill structure is formed principally of a pair of spaced channel members 19 and 21 arranged with the flanges thereof turned outwardly as best shown in FIG. 9. These channel members are connected at spaced inervals with top and bottom plates and these parts are secured to the car body 14 and forms the fixed sill structure.

An auxiliary sill structure 25 (FIGS. 1, 4, 8 and 9) is arranged within the fixed sill structure 20 and is adapted to move longitudinally with respect thereto. The auxiliary sill strucure 25 is continuous throughout its length and projects beyond the ends of fixed sill structure and beyond the ends of the car body as shown in FIG. 1. The auxiliary sill structure 25 extends beyond the ends of the fixed sill structure a predetermined distance in order to accommodate relative sliding movements of the sill structures during a collision with other vehicles. The normal or neutral position of the auxiliary sill structure 25 as it projects beyond the ends of the fixed sill structure 20 is shown in FIG. 1. The auxiliary sill structure is formed principally of two channel members 22 and 23 with the flanges thereof disposed outwardly.

A striker casting 26 is provided at each end of the auxiliary sill structure 25 and a coupler carrier 27 thereon supports the stem of the associated coupler in a conventional manner. The auxiliary sill structure carries front draft lugs 29 and rear draft lugs 31. These draft lugs are of enlarged dimensions and ribs 30 extend therebetween as shown in FIGS. 2 and 9. Each coupler is provided with a conventional type of draft rigging which includes a yoke 32 and a resilient draft gear as represented by phantom lines 33 and the usual front and rear followers 34 and 36. The ribs 30 provide guides for the followers 34 and 36. Such a coupler and a draft gear therefor is arranged at each end of the auxiliary sill structure 25 and cooperate in the usual manner with the coupler carrier 27 and the front draft lugs 29 and the rear draft lugs 31.

A body center plate 38 is provided at each truck center as shown in FIG. 1 and the structure thereof and the manner by which it is secured to the fixed sill structure is best shown in FIGS. 2 and 11. The center plate 38 includes lateral projections 40 which extend under the lower flanges of the channel members 19 and 21 of the fixed sill structure 20 and under the body bolster bottom cover plate 39 which extends under the fixed sill at this location and is also secured to the lower flanges of the channel members 19 and 21. The body center plate 38 and its lateral portions 40 are reinforced by a pair of transversely extending beams 41 and 42 which extend under the outturned flanges of the channel members 19 and 21. A lower part 44 of the center post may be formed integral with the center plate 38 while the upper part 43 may be attached by any suitable means such as welding to a top plate 47 which is secured to the upper flanges of the channel members 19 and 21 as shown in FIG. 11. The channel members 22 and 23 of the auxiliary sill structure 25 are joined by a top plate 45 as shown in FIGS. 2 and 9 which is continuous from the striker 26 to the face 85 of the abutment member 86. A slot 50 is provided in the plate 45 to accommodate movements of the auxiliary sill structure 25 relative to the center post which has its upper part secured to the plate 47. The plate 45 is secured to the outturned flanges of the channel members 22 and 23 by welding as shown in FIG. 9.

A spring seat 48 is provided on the upper part 43 and the lower part 44 of the center post structure. Semicylindrical flanges 51 and 52 (FIG. 13) extend respectively from the upper and lower parts of the center post structure and serve to position the outer end of a tube 53 as shown in FIG. 2. A member 54 is secured to the auxiliary sill structure 25 in any suitable manner such as by welding and has a circular opening therein for receiving and providing guiding support for the tube 53. A spring 49 of a helical type embraces the tube 53. The ends of the spring 49 are in abutting relation with the spring seat 48 and the member 54. A lug 56 (FIGS. 2 and 13) is carried by the semi-circular flange 52 and is engaged by the hook-shaped end of the rod 57 which extends along the axis of the tube 53. A cap member 58 at the end of the tube and a nut 59 threaded on the rod 57 serves to maintain the tube in operative relationship with the center post structure whereby the tube 53 provides support for the spring 49. In the normal or neutral position of the auxiliary sill structure 25 with respect to the fixed sill structure 20 as shown in FIGS. 2 and 4 the spring 49 has a predetermined amount of compression.

Figure 5:
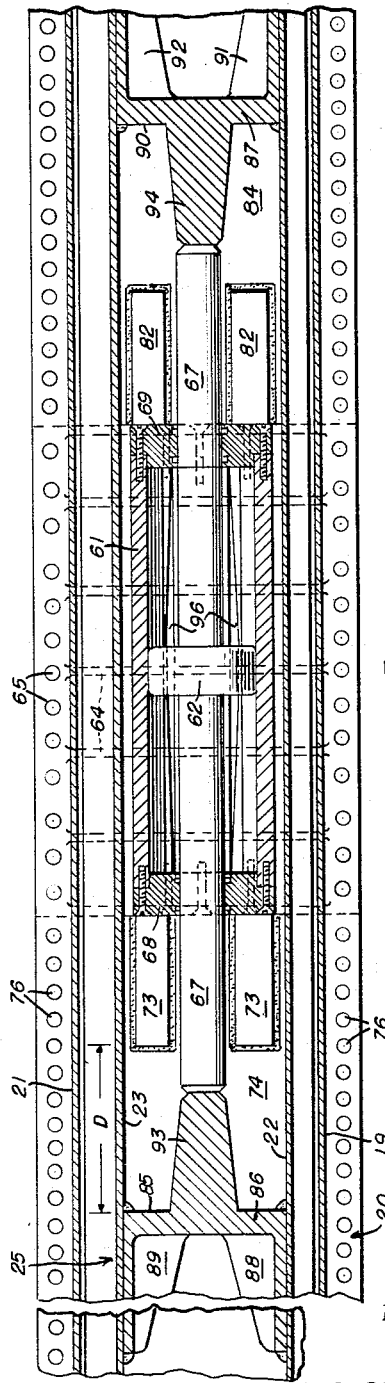
FIG. 5 is a sectional plan view of the portion of the energy absorbing mechanism shown in FIG. 3.

A cylinder 61 of rugged construction is arranged in a central position with respect to the length of the car body and accommodated within the dual sill structures. The wall of the cylinder 61 is of substantial thickness to withstand the pressures developed during metering of the liquid in absorbing the impact energy. The interior surface of the cylinder is of cylindrical shape and a piston 62 is adapted to move axially relative to that cylinder. In the normal or neutral position of the auxiliary sill structure 25 with respect to the fixed sill structure 20 the piston 62 occupies a central position in the cylinder 61 as shown in FIGS. 3 and 5. The cylinder 61 is supported on the fixed sill structure 20 by means of a bottom plate 63 (FIG. 10) which is attached to the outturned flanges of the channel members 19 and 21 by suitable means such as rivets 65. The bottom plate 63 is reinforced by transversely extending ribs 64 which may be formed integral with the plate 63. The cylinder 61 is further attached to the fixed sill structure 20 by means of a top plate 66 which overlies the top wall of the cylinder 61 and the plate 66 may be attached to the outturned upper flanges of the channel members 19 and 21 by means of rivets 70 as shown in FIG. 10.

The piston 62 is rigidly secured to or formed integral with a piston rod 67 which extends from each side of the piston 62 and through respective cylinder caps 68 and 69. The cylinder 61 is filled with liquid which may be introduced through a fill opening 71 (FIGS. 3 and 10) which is closed by a threaded plug 72. The channel members 21 and 23 are provided with slots for the removal of the plug 72 and the introduction of liquid into the opening 71 after which the plug 72 may be reemployed to seal the fill opening.

Endwise movement of the cylinder 61 with respect to the car body and with respect to the fixed sill structure 20 is prevented by means of stop members secured to the fixed sill structure 20. The stop members take the form of block-shaped elements 73 spaced from each other transversely of the assembly and welded to a bottom plate 74 as shown in FIGS. 3, 5 and 12. The plate 74 is secured to the outturned flanges of the channel members 19 and 21 by rivets 76 as best shown in FIG. 12. The block-shaped elements 73 have their ends in abutting engagement with the cylinder cap 68 as shown in FIG. 3. The restraining means at this end of the cylinder 61 includes two additional transversely spaced block-shaped elements 77 as shown in FIGS. 3 and 12 which are welded to a top plate 78. The plate 78 is attached to the outturned upper flanges of the channel members 19 and 21 by any suitable means such as rivets 79. The restraining means at the opposite end of the cylinder 61 includes similarly transversely spaced top and bottom block elements 81 and 82 which are welded respectively to a top plate 83 and to a bottom plate 84 (FIG. 3). These plates are attached respectively to the outturned upper and bottom flanges of the channel members 19 and 21. The block elements 81 and 82 are in abutting relationship with the cylinder cap 69. Thus the cylinder 61 is supported by the fixed sill structure 20 and effectively restrained from endwise movement with respect to the fixed sill structure which is in turn fixed to the railway vehicle body.

An abutment member 86 is provided at one end of the cylinder 61 and another abutment member 87 is provided at the other end of the cylinder. These abutment members are rigidly secured to the auxiliary sill structures 25. The abutment member 86 is provided with ears 88 and 89 which extend along the channel members 22 and 23 and are welded thereto. The abutment member 87 is provided with ears 91 and 92 which lie along and are welded to the channel members 22 and 23. The abutment member 86 is provided with a central projection 93 which is of such dimensions measured transversely as shown in FIGS. 5 and 12 to fit with clearance between the stop members or block-shaped elements 73 and 77. The free end of the projection 93 engages one end of the piston rod 67. The abutment member 87 also carries a central projection 94 which is of such dimensions measured transversely thereof as to fit with clearance between the transversely spaced stop members 81 and 82 at this end of the cylinder 61. The end of the projection 94 is in engagement with the other end of the piston rod 67.

The inner face 85 (FIG. 5) of the abutment member 86 is spaced a distance D from the free ends of the stop members so as to provide for relative movement of the auxiliary sill structure 25 with respect to the cylinder 61. The face 90 of the abutment member 87 is similarly spaced from the stop members at the other end of the cylinder. The distance D represents a maximum relative movement of the auxiliary sill structure 25 with respect to the fixed sill structure 20 and it is during movement throughout this distance wherein the metering of the liquid in the cylinder absorbs the impact energy.

The cylinder 61 is provided with metering grooves 96 which may be formed within the thick wall of the cylinder. These grooves taper from a maximum depth or cross section at the center of the cylinder to reduced depth or reduced cross section at each end of the cylinder. The profile of each groove, or changes in its cross section, may be determined mathematically to produce the metering effect desired for cushioning movement of the piston 62 relative to the cylinder 61 in either direction in response to movement of the auxiliary sill structure 25 relative to the fixed sill structure 20. The cylinder being filled with liquid movement of the piston 62 in either direction forces the liquid to flow from one side of the piston to the other through the metering grooves 96.

A bottom plate 95 (FIGS. 2 and 9) is connected to the outturned bottom flanges of the channel members 22 and 23 of the auxiliary sill structure 25 and provide support for the yoke 32 and the draft gear diagrammatically represented at 33. A bottom plate 97 is connected to the outturned bottom flanges of the channel members 19 and 21 of the fixed sill structure 20 as shown and provides support for the overhanging end portion of the auxiliary sill structure.

The features of the dual sill structures and the center post and the draft rigging to the right of the central portion of the car body or to the right of the cylinder 61 is identical with that described in detail in connection with the left portion and FIG. 8 shows most of these elements in operative relationship.

The mechanism operates to control the magnitude of buffing forces and pulling forces and the conventional draft equipment at each end of the auxiliary sill structure functions to protect the auxiliary sill assembly from high impact forces. While the conventional draft gears as employed in connection with the present assembly assist the hydraulic mechanism in absorbing the energy of collisions such draft gears are not significantly helpful in connection with high velocity collisions because of the low capacity of the conventional type resilient draft gears. Upon application of an impact force in the direction of the arrow 98 (FIG. 6) the auxiliary sill structure 25 is displaced to the right relative to the fixed sill structure 20. Such a condition may develop as a result of a collision applied on the coupler 17 in a coupling operation or upon application of a sudden pull applied to the coupler 18. A maximum displacement of the auxiliary sill structure and the parts carried thereby to the full extent relative to the fixed sill structure is shown in FIGS. 6, 7 and 8.

The draft gear 33 is compressed an amount consistent with the force developed and the follower 34 moves this distance to the right to the position shown in FIG. 6. The follower 36 being in contact with the rear draft lugs 31 moves the auxiliary sill structure 25 to the right as shown in FIGS. 6 and 7 with resect to the fixed sill structure 20. The guide member 54 which is attached to the auxiliary sill structure 25 moves away from the spring seat 48 and the recoil spring 49 expands. The abutment member 86 and its projection 93 are moved to the right from the normal position and urge the piston rod 67 and the piston 62 towards the right end of the cylinder 61. This movement of the piston relative to the cylinder is cushioned by the liquid which is forced to move through the metering grooves 96. The reaction force of the cylinder 61 is then applied through the block-shaped elements 81 and 82 onto the fixed sill structure 20 and thence to the body of the railway vehicle. The relative movement of the auxiliary sill structure 25 to the right with respect to the fixed sill structure 20 ends when there is contact between the face 85 of the abutment member 86 and the free ends of the stop members in the form of the block-shaped elements 73 and 77. The recoil spring 49R is then compressed to its maximum extent as shown in FIG. 8 and this spring together with the spring 49 return the auxiliary sill structure 25 to its normal or neutral position upon completion of the impact stroke.

It is to be observed that full closure of the mechanism as shown in FIGS. 6, 7 and 8 occurs only under maximum conditions of collision which the hydraulic means is designed to accommodate. The usual closure will be somewhat less than that illustrated with all of the energy of the collision being dissipated without full closure. The orifices or grooves 96 in the cylinder may be designed to produce as nearly as possible a rectangular force closure curve for substantially all car loads and at all speeds of approach producing an optimum condition of maximum energy absorption with minimum force and minimum closure. The structure disclosed provides the advantage that it can be metered to absorb the energy of collisions between railway vehicles of weights varying from an empty car up to a fully loaded one hundred ton capacity car without developing forces which are destructive to either the lading or the car structure. The force which the hydraulic mechanism must be metered to develop in order to absorb the energy of a given collision is inversely proportional to the maximum relative longitudinal movement which it is practical to provide between the auxiliary sill structure and the fixed sill structure. As an example it has been found practical to meter the mechanism disclosed in the present application to absorb the energy of a collision between two fully loaded fifty ton cars at an initial speed of approach of approximately twelve miles per hour with the resulting maximum acceleration of about three times the acceleration of gravity whereas existing resilient draft gears will close to a solid condition in collisions resulting from speeds of approach of about four to five miles per hour and it has been found that at speeds of twelve miles per hour accelerations as high as thirty times the acceleration of gravity have been produced in the car bodies equipped with conventional type of resilient draft gears.

While the invention has been described with regard to one type of railway vehicle it will be appreciated that the invention is adaptable to other railway equipment and may be used in connection with other types of draft riggings and sill structures. Such modifications and others may be made without departing from the spirit and scope of the invention as set forth in the appended claims.

What I claim and desire to secure by Letters Patent is:

1. A mechanism for absorbing the energy of an impact applied to a coupler of a railway vehicle comprising, a railway vehicle body, a center sill structure extending longitudinally of said body, means fixing the center sill structure to the vehicle body, an auxiliary sill structure extending lengthwise within said center sill structure and adapted to move longitudinally relative to said center sill structure, a coupler and a draft rigging arranged within each end portion of said auxiliary sill structure, means connecting each draft rigging to the auxiliary sill structure so that it moves relative to the center sill structure upon application of an impact to either coupler, a sole hydraulic device within said sill structures having two relatively movable parts, liquid within said hydraulic device, means metering movement of said liquid upon relative movements of said parts, means carried by the auxiliary sill structure abutting one of said parts, and means carried by the center sill structure abutting the other of said parts.

2. A mechanism for absorbing the energy of an impact applied to the coupler of a railway vehicle comprising, a center sill structure extending longitudinally of the railway vehicle body and secured thereto, an auxiliary sill structure extending lengthwise within said center sill structure and adapted to move longitudinally with respect thereto, a coupler and a stem therefor extending within each end of said auxiliary sill structure, means connecting each stem to said auxiliary sill structure, a hydraulic device carried by said center sill structure, means preventing movement of said hydraulic device longitudinally of said center sill structure, said device having a metering orifice therein, liquid within said hydraulic device for movement through said orifice, and means for forcing liquid through said orifice in response to relative movement of the auxiliary sill structure in either direction with respect to the center sill structure.

3. A mechanism for absorbing the energy of impacts applied to a coupler of a railway vehicle comprising, a railway vehicle body, a center sill structure extending longitudinally of said body, means fixing the center sill structure to the vehicle body, an auxiliary sill structure extending lengthwise within said center sill structure and adapted to move longitudinally relative thereto, a coupler including a stem extending into an end of said auxiliary sill structure, means connecting the stem to the auxiliary sill structure for moving the auxiliary sill structure relative to the center sill structure upon application of an impact to said coupler, a cylinder within said center sill structure, means carried by said center sill structure in abutting relationship with ends of said cylinder, a piston arranged for movement within said cylinder, liquid filling said cylinder, a piston rod extending from said piston, an abutment member carried by the auxiliary sill structure having means thereon for engaging and moving said piston rod, and means restricting movement of the liquid past said piston.

4. A cushion mechanism for a railway vehicle for absorbing the energy of an impact applied to a coupler thereof comprising, a railway vehicle body, a center sill structure extending longitudinally of said body from a first end to a second end and secured to said vehicle body, an auxiliary sill structure extending lengthwise within said center sill structure and adapted to move longitudinally thereof, a coupler and a draft rigging arranged within said auxiliary sill structure adjacent said first end, a coupler and draft rigging arranged within said auxiliary sill structure adjacent said second end, means connecting each draft rigging to said auxiliary sill structure so that it moves relative to the center sill structure upon application of force to either coupler, a cylinder mounted within said sill structures, means carried by the center sill structure preventing movement of said cylinder with respect to the center sill structure, a piston movable within said cylinder, liquid within said cylinder, said cylinder having a metering groove in the wall thereof of progressively less cross sectional area in proceeding from a central portion of the cylinder, a piston rod extending from each end of the cylinder, means carried by said auxiliary sill structure for engaging one end of the piston rod, and means carried by said auxiliary sill structure for engaging the other end of the piston rod.

5. A cushion mechanism for a railway vehicle for absorbing the energy of an impact applied to a coupler thereof comprising, a railway vehicle body, a center sill structure extending longitudinally of said body from a first end to a second end, means fixing the center sill structure to the vehicle body, an auxiliary sill extending longitudinally within said center sill structure and adapted to move longitudinally with respect thereto and having a neutral position, a coupler and a draft rigging arranged within said auxiliary sill structure adjacent said first end of said body, a coupler and a draft rigging arranged within said auxiliary sill structure adjacent said second end of said body, means connecting each draft rigging to said auxiliary sill structure whereby it is moved relative to said center sill structure upon application of an impact to either coupler, a cylinder mounted within said auxiliary sill structure, means securing the cylinder to the center sill structure, a piston movable within said cylinder and arranged in a central position therein in the neutral position of said auxiliary sill structure, liquid substantially filling said cylinder, means between the cylinder and the piston providing a metering opening, and means carried by said auxiliary sill structure for moving the piston in either direction from said neutral position upon movement of the auxiliary sill structure with respect to the center sill structure in response to an impact applied to either coupler to force said liquid through said metering opening.

6. A cushion mechanism according to claim 5 wherein the means providing the metering opening takes the form of a groove in the cylinder wall which has less cross sectional area in proceeding from the neutral position of said piston.

7. A cushion mechanism for a railway vehicle for absorbing the energy of an impact applied to a coupler thereof comprising, a railway vehicle body, a center sill structure extending longitudinally of said body from a first end to a second end, means fixing the center sill structure to the vehicle body, an auxiliary sill extending longitudinally within said center sill structure and adapted to move longitudinally with respect thereto and having a neutral position, a coupler and a draft rigging arranged within said auxiliary sill structure adjacent said first end of said body, a coupler and a draft rigging arranged within said auxiliary sill structure adjacent said second end of said body, means connecting each draft rigging to said auxiliary sill structure whereby it is moved relative to said center sill structure upon application of an impact to either coupler, a cylinder mounted within said auxiliary sill structure, means securing the cylinder to the center sill structure, a piston movable within said cylinder and arranged in a central position therein in the neutral position of said auxiliary sill structure, liquid substantially filling said cylinder, a piston rod carried by the piston extending beyond each end of the cylinder, means carried by the auxiliary sill structure engaging one end of said rod, means carried by the auxiliary sill structure engaging the other end of said rod, said cylinder having a plurality of grooves in the wall thereof, each groove having a maximum depth at the central portion of the cylinder and having progressively less depth in proceeding towards the respective ends of the cylinder.

8. A cushion mechanism according to claim 7 wherein the means securing the cylinder to center sill structure includes top and bottom plates and stop members attached to the center sill structure and engaging ends of the cylinder.

9. A mechanism for absorbing the energy of an impact applied to a coupler of a railway vehicle comprising, a railway vehicle body, a center sill structure extending longitudinally of said body and secured thereto, an auxiliary sill structure extending longitudinally within said center sill structure and arranged for lengthwise movements with respect to the center sill structure, resilient means maintaining said auxiliary sill structure in a neutral position with respect to the center sill structure, a coupler and a draft rigging arranged within the auxiliary structure, means connecting said draft rigging to said auxiliary sill structure, a cylinder mounted within said sill structures, means including transversely spaced block elements secured to said center sill structure engaging the respective ends of the cylinder maintaining it in a fixed position with respect to the center sill structure, a piston mounted for movement within the cylinder, a rod carried by said piston extending towards the coupler through the associated end of the cylinder, liquid within said cylinder, an abutment member carried by the auxiliary sill structure spaced from one end of the cylinder in the neutral position of the auxiliary sill structure, means carried by said abutment member engaging said piston rod in the neutral position of the auxiliary sill structure, and said cylinder having a metering opening through which said liquid is forced by movement of the piston.

10. A mechanism for absorbing the energy of an impact applied to a coupler of a railway vehicle comprising, a railway vehicle body, a center sill structure extending longitudinally of said body and secured thereto, an auxiliary sill structure extending longitudinally within said center sill structure and arranged for lengthwise movements with respect to the center sill structure, a center post structure extending vertically through said auxiliary sill structure, resilient means engaging said center post structure maintaining said auxiliary sill structure in a neutral position with respect to the center sill structure, a coupler and a draft rigging arranged within the auxiliary structure, means connecting said draft rigging to said auxiliary sill structure, a cylinder mounted within said sill structures, means secured to said center sill structure engaging an end of the cylinder remote of the coupler maintaining it in a fixed position with respect to the center sill structure, a piston mounted for movements within the cylinder, liquid substantially filling said cylinder, an abutment member carried by the auxiliary sill structure spaced from the other end of the cylinder in the neutral position of the auxiliary sill structure, a projection carried by said abutment member engaging said piston rod in the neutral position of the auxiliary sill structure, and said cylinder having a metering groove therein through which said liquid is forced upon movement of the piston relative to the cylinder.

11. A mechanism according to claim 10, wherein a plate connects an upper portion of the auxiliary sill structure and is provided with a longitudinally extending slot in the vicinity of the center post structure.

12. A mechanism for absorbing the energy of an impact applied to a coupler of a railway vehicle comprising, a railway vehicle body, a center sill structure extending longitudinally of said body and secured thereto, an auxiliary sill structure extending longitudinally within said center sill structure and arranged for lengthwise movements with respect to the center sill structure, resilient means maintaining said auxiliary sill structure in a neutral position with respect to the center sill structure, a coupler and a draft rigging arranged within each end of the auxiliary structure, means connecting each draft rigging to said auxiliary sill structure, a cylinder mounted within the mid-portion of the center sill structure, means including sets of transversely spaced block elements secured to said center sill structure engaging respective ends of the cylinder maintaining it in a fixed position with respect to the center sill structure, a piston mounted for movements within the cylinder and having a central position therein in the neutral position of the auxiliary sill structure, a piston rod carried by the piston extending beyond both ends of the cylinder, liquid substantially filling said cylinder, abutment members carried by the auxiliary sill structure each spaced from one set of said block elements in the neutral position of the auxiliary sill structure, a projection carried by each abutment member engaging an associated end of said piston rod in the neutral position of the auxiliary sill structure, said projection having transverse dimensions less than the space between the associated block elements, and said cylinder having a metering groove therein through which said liquid is forced upon relative movements of the piston and cylinder.

13. A mechanism according to claim 12, wherein the block elements are secured to top and bottom plates carried by the center sill structure.

14. A mechanism for absorbing the energy of an impact applied to a coupler of a railway vehicle comprising, a railway vehicle body, a center sill structure extending longitudinally of said body and secured thereto, an auxiliary sill structure extending longitudinally within said center sill structure and arranged for lengthwise movements with respect to the center sill structure, resilient means maintaining said auxiliary sill structure in a neutral position with respect to the center sill structure, a coupler and a draft rigging arranged within each end of the auxiliary sill structure, means connecting each draft rigging to said auxiliary sill structure, a cylinder mounted within the mid-portion of said center sill structure, transversely spaced block elements secured to said center sill structure engaging the respective ends of the cylinder maintaining it in a fixed position with respect to the center sill structure, a piston mounted for movements within the cylinder and having a mid-position therein in the neutral position of the auxiliary sill structure, a piston rod carried by the piston extending from each end of the cylinder, liquid substantially filling said cylinder, abutment members carried by the auxiliary sill structure spaced from the associated block elements in the neutral position of the auxiliary sill structure, a projection carried by each abutment member engaging an end of said piston rod, and said cylinder having a plurality of metering grooves in the wall thereof through which said liquid is forced upon relative movements of the piston with respect to the cylinder.

15. A cushion mechanism for a railway vehicle for absorbing the energy of an impact applied to a coupler thereof comprising, a vehicle body, a center sill structure extending longitudinally of said body and secured thereto, an auxiliary sill structure extending lengthwise within said center sill structure arranged for movements longitudinally relative to said center sill structure, a coupler and a draft rigging carried by an end portion of said auxiliary sill structure, means coupling said draft rigging to said auxiliary sill structure for moving the auxiliary sill structure relative to said center sill structure upon application of an impact to said coupler, a cylinder mounted within said auxiliary sill structure, a piston within said cylinder, a piston rod extending through opposite ends of said cylinder, liquid within said cylinder, means carried by the auxiliary sill structure in abutting relationship with one end of said piston rod, means carried by the auxiliary sill structure in abutting relationship with the other end of said piston rod, members carried by the center sill structure engaging opposite ends of said cylinder preventing longitudinal movements of the cylinder relative to the center sill structure, and means for controlling the flow of liquid from one side of said piston to the other side thereof to cushion movements of the auxiliary sill structure relative to the center sill structure.

16. A cushion mechanism for a railway vehicle for absorbing the energy of an impact applied to a coupler thereof comprising, a vehicle body, a center sill structure extending longitudinally of said body and secured thereto, an auxiliary sill structure extending lengthwise within said center sill structure arranged for movements longitudinally relative to said center sill structure, a coupler and a draft rigging carried by an end portion of said auxiliary sill structure, means coupling said draft rigging to said auxiliary sill structure for moving the auxiliary sill structure relative to said center sill structure upon application of an impact to said coupler, a cylinder mounted within said auxiliary sill structure, a piston within said cylinder, a piston rod extending through opposite ends of said cylinder, liquid within said cylinder, members carried by one of said sill structures in abutting relationship with the opposite ends of said cylinder, members carried by the other of said sill structures in abutting relationship with opposite ends of said piston rod to produce relative movement between the piston and the cylinder during relative movement of the auxiliary sill structure and the center sill structure, and means metering movement of said liquid during relative movement of the piston and the cylinder.

17. A cushion mechanism for a railway vehicle for absorbing the energy of an impact applied to a coupler thereof comprising, a vehicle body, a center sill structure extending longitudinally of said body and secured thereto, an auxiliary sill structure extending lengthwise within said center sill structure arranged for movements longitudinally relative to said center sill structure, a coupler and a draft rigging carried by an end portion of said auxiliary sill structure, means coupling said draft rigging to said auxiliary sill structure for moving the auxiliary sill structure relative to said center sill structure upon application of an impact to said coupler, a cylinder mounted within said auxiliary sill structure, a piston within said cylinder, a piston rod extending through opposite ends of said cylinder, liquid within said cylinder, means securing said cylinder against axial movements with respect to said center sill structure, members carried by the auxiliary sill structure in abutting relationship with opposite ends of said piston rod to produce relative movement between the piston and the cylinder during relative movement of the auxiliary sill structure and the center sill structure, and means metering movement of said liquid during relative movement of the piston and the cylinder.

18. In combination, an underframe structure having a guideway extending lengthwise therethrough, a rigid elongated unitary column structure in the guideway to project beyond opposite ends thereof and slidably supported from said underframe structure, and hydraulic cushioning mechanism disposed within said guideway intermediately therealong and including a double-ended hydraulic cylinder lengthwise in the guideway and a double-ended piston and piston rod assembly slidable in the cylinder to develop hydraulic fluid pressure therein, said mechanism having means providing a hydraulic fluid flow path between opposite ends of the cylinder for developing fluid frictional resistance to relative lengthwise movement between the cylinder and the assembly, with the cylinder fixed to one of the structures and the assembly fixed to the other structure so that the mechanism resists relative lengthwise movement between the structures by developing hydraulic fluid friction under hydraulic pressure.

19. In combination, an underframe structure having a guideway open at the bottom and extending lengthwise through the underframe structure, a channel shaped floating sill structure having an open bottom and supported from the underframe structure for lengthwise sliding movement in the guideway, said floating sill structure extending the length of said guideway and having aligned draft pockets adjacent opposite ends thereof, a draft gear mechanism operatively mounted in each pocket, coupling mechanism to each draft gear mechanism for transmitting buff and draft impact forces therethrough to the floating sill structure, and a double acting hydraulic cushioning unit disposed in the floating sill structure intermediately between and aligned with the draft pockets and arranged in operative engagement between the structures to develop only fluid frictional resistance to relative lengthwise movement between the structures for absorbing the energy of buff or draft impacts applied through one of the coupling mechanisms.

20. In combination, an underframe structure having a guideway extending lengthwise therethrough, a rigid elongated unitary column structure in the guideway to project beyond opposed ends thereof and slidably supported from said underframe structure, a double acting hydraulic cushioning mechanism disposed within said guideway intermediately therealong and including a hydraulic cylinder lengthwise in the guideway and a piston and piston rod assembly slidable in the cylinder to develop hydraulic fluid pressure therein, said mechanism having flow restricting means providing a hydraulic fluid flow path between opposite sides of the piston for developing fluid frictional resistance to relative lengthwise movement between the cylinder and the assembly, and abutment means on one of said structures engaging said cylinder and abutment means on the other of said structures engaging said assembly so that the mechanism resists relative lengthwise movement between the structures by developing hydraulic fluid friction under hydraulic pressure.

21. The combination of claim 20 further characterized by the provision of spring means for returning said cushioning mechanism to its initial position following an impact force against either end of said column structure.

22. In a railway car: a longitudinally extending hollow center sill fixed to the car; a sliding center sill member longitudinally slidably mounted in said fixed center sill; cooperating stop means carried by said fixed center sill and said sliding member permitting limited longitudinal movement of said member; resilient means biasing said member to a neutral position with respect to said car; a double-acting, hydraulic, piston-and-cylinder buffer mechanism having a first external coupling element rigidly connected to the piston and a second external coupling element rigidly connected to the cylinder; means rigidly connecting one of said coupling elements to said sliding member for movement with the latter; means rigidly connecting the other of said coupling elements fixedly to said car; and means for coupling said sliding center sill to an adjacent car.

23. In a railway car: a longitudinally extending hollow center sill fixed to the car; a sliding center sill member longitudinally slidably mounted in said fixed center sill and extending substantially the entire length of said fixed center sill; cooperating stop means carried by said fixed center sill and said sliding member permitting limited longitudinal movement of said member; resilient means biasing said member to a neutral position midway between the limits of movement of said member; a double-acting, hydraulic, piston-and-cylinder buffer mechanism having a first external coupling element rigidly connected to the piston and a second external coupling element rigidly connected to the cylinder; means rigidly connecting one of said coupling elements to said sliding member for movement with the latter; means rigidly connecting the other of said coupling elements to said fixed center sill; and car couplers fixed to each end of said sliding center sill member.

24. In combination, an underframe structure having a guideway extending lengthwise therethrough, a rigid elongated unitary column structure in the guideway to project beyond opposed ends thereof and slidably supported from said underframe structure, a double acting hydraulic cushioning mechanism disposed within said guideway intermediately therealong and including a hydraulic cylinder lengthwise in the guideway and a piston and piston rod assembly slidable in the cylinder to develop hydraulic fluid pressure therein, said mechanism having flow restricting means providing a hydraulic fluid flow path between opposite sides of the piston for developing fluid frictional resistance to relative lengthwise movement between the cylinder and the assembly, and abutment means on one of said structures engaging said cylinder and abutment means on the other of said structures engaging said assembly so that the mechanism resists relative lengthwise movement between the structures by developing hydraulic fluid friction under hydraulic pressure.

25. The combination of claim 24 further characterized by the provision of spring means for returning said cushioning mechanism to its initial position following an impact force against either end of said column structure.

26. A mechanism for absorbing the energy of an impact applied to a railway vehicle, comprising a railway vehicle body, a center sill structure extending longitudinally of said body, means fixing the center sill structure to the vehicle body, an auxiliary sill structure extending lengthwise within said center sill structure and adapted to move longitudinally relative to said center sill structure upon application of an impact to either end of said auxiliary sill structure, a hydraulic device within said sill structures having two relatively movable parts, liquid within said hydraulic device, means metering movement of said liquid upon relative movements of said parts, means carried by the auxiliary sill structure abutting one of said parts, and means carried by the center sill structure abutting the other of said parts.

27. In combination, an underframe structure having a guideway extending lengthwise therethrough, a rigid elongated unitary column structure in the guideway to project beyond opposite ends thereof and slidably supported from said underframe structure, a hydraulic cushioning mechanism disposed within said guideway intermediately therealong and including a hydraulic cylinder lengthwise in the guideway and a piston and piston rod assembly slidable in the cylinder to develop hydraulic fluid pressure therein, said mechanism having flow restricting means providing a hydraulic fluid flow path between opposite sides of the piston for developing fluid frictional resistance to relative lengthwise movement between the cylinder and the assembly, and abutment means on one of said structures engaging said cylinder at one end of said mechanism and abutment means on the other of said structures engaging said assembly at the opopsite end of said mechanism so that the mechanism resists relative lengthwise movement in either direction between the structures by developing hydraulic fluid friction under hydraulic pressure.

28. The combination of claim 27 further characterized by the provision of spring means for returning said cushioning mechanism to its initial position following an impact force against either end of said column structure.

29. The combination of claim 27 further characterized by the provision of a pair of return spring assemblies disposed in spaced relation at opposite ends of said cushioning mechanism and having means coacting with said structures for returning said cushioning mechanism to its initial position following an impact force against either end of said column structure.

References Cited by the Examiner

UNITED STATES PATENTS

| | | | |
|---|---|---|---|
| 1,141,696 | 6/15 | Fernanze | 213—43 |
| 1,772,387 | 8/30 | Dickerson | 213—43 |
| 2,047,955 | 7/36 | Fitch | 213—8 X |
| 2,752,048 | 6/56 | Fillion | 213—8 |

LEO QUACKENBUSH, *Primary Examiner.*

LEO J. LEONNIG, JAMES S. SHANK, *Examiners.*